(12) United States Patent
Wang et al.

(10) Patent No.: US 12,409,788 B1
(45) Date of Patent: Sep. 9, 2025

(54) BIKE RACK

(71) Applicant: KING RACK INDUSTRIAL CO., LTD., Taichung (TW)

(72) Inventors: Chiu-Kuei Wang, Taichung (TW); Hugues Espesset, St-Juery (FR); Girod Frédéric, St-Juery (FR)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 78 days.

(21) Appl. No.: 18/595,456

(22) Filed: Mar. 5, 2024

(51) Int. Cl.
*B60R 9/10* (2006.01)
*B60R 9/06* (2006.01)
*B60P 1/43* (2006.01)

(52) U.S. Cl.
CPC .................. *B60R 9/10* (2013.01); *B60R 9/06* (2013.01); *B60P 1/43* (2013.01)

(58) Field of Classification Search
CPC ................. B60R 9/10; B60R 9/06; B60P 1/43
See application file for complete search history.

(56) References Cited

U.S. PATENT DOCUMENTS

| | | | | |
|---|---|---|---|---|
| 8,272,547 | B1 * | 9/2012 | Mital | B60R 9/10 224/501 |
| 11,242,101 | B2 * | 2/2022 | Kuschmeader | B60R 9/06 |
| 11,383,652 | B1 * | 7/2022 | Huang | B60R 9/10 |
| 11,648,885 | B2 * | 5/2023 | Wang | B60R 9/10 224/488 |
| D1,016,723 | S * | 3/2024 | Wang | D12/407 |
| D1,045,754 | S * | 10/2024 | Huo | D12/408 |
| 12,187,236 | B2 * | 1/2025 | Huo | B60R 9/10 |
| D1,068,625 | S * | 4/2025 | Wang | D12/407 |
| 2010/0230455 | A1 * | 9/2010 | Wang | B60R 9/06 224/533 |
| 2020/0156724 | A1 * | 5/2020 | Kuschmeader | B60R 9/06 |
| 2020/0406825 | A1 * | 12/2020 | Wang | B60R 9/048 |
| 2022/0055703 | A1 | 2/2022 | Kuschmeader et al. | |
| 2022/0203903 | A1 * | 6/2022 | Wang | B60R 9/06 |
| 2023/0202403 | A1 * | 6/2023 | Wang | B60R 9/06 224/549 |
| 2024/0010136 | A1 * | 1/2024 | Kuschmeader | B60R 9/10 |

(Continued)

FOREIGN PATENT DOCUMENTS

| | | | |
|---|---|---|---|
| CN | 109689996 A | | 4/2019 |
| CN | 109720444 A | | 5/2019 |

(Continued)

*Primary Examiner* — William L Miller
(74) *Attorney, Agent, or Firm* — ScienBiziP, P.C.

(57) ABSTRACT

A bike rack for connecting to a connecting device of a vehicle to provide transportation functionality is provided. The bike rack includes a base; a carrying frame including at least one pair of carrying frame brackets that is configured to carry a front wheel and a rear wheel of a bike, each carrying frame bracket connected to the base, and a coupling portion arranged at one end of each carrying frame bracket distal to the base; a bearing mount located on one side of one of the at least one pair of carrying frame brackets; and a ramp board storable on the bearing mount. One end of the ramp board is formed with a corresponding coupling portion. The coupling portion of each carrying frame bracket is joinable with the corresponding coupling portion of the ramp board, such that the ramp board is inclined relative to the corresponding carrying frame bracket.

11 Claims, 7 Drawing Sheets

(56) References Cited

U.S. PATENT DOCUMENTS

| | | | | |
|---|---|---|---|---|
| 2024/0253575 A1* | 8/2024 | Nilvius | ................... | B60R 9/06 |
| 2024/0351529 A1* | 10/2024 | Li | ............................ | B60R 9/06 |
| 2024/0399972 A1* | 12/2024 | Willems | ................... | B60R 9/10 |
| 2025/0018873 A1* | 1/2025 | Weinert | ................... | B60R 9/06 |
| 2025/0083613 A1* | 3/2025 | Williams | ................. | B60R 9/06 |

FOREIGN PATENT DOCUMENTS

| | | | | |
|---|---|---|---|---|
| DE | 102012012889 A1 | 1/2014 | | |
| DE | 202024107105 U1 * | 2/2025 | ............... | B60R 9/10 |
| EP | 3756953 A1 * | 12/2020 | ............... | B60R 9/10 |
| EP | 3756956 A1 * | 12/2020 | ............... | B60R 9/10 |
| EP | 3978315 A2 * | 4/2022 | ............... | B60R 9/10 |
| EP | 4019335 A1 * | 6/2022 | ............... | B60R 9/10 |
| TW | M473345 U | 3/2014 | | |
| TW | M593958 U | 4/2020 | | |
| WO | 2023092035 A1 | 5/2023 | | |

\* cited by examiner

BIKE RACK

FIELD

The present disclosure generally relates to bike racks and, more particularly, to a bike rack, which is convenient for carrying bikes and storing ramp board.

BACKGROUND

Racks are generally used for loading vehicles such as bikes, electric bikes, and electric scooters. A user must manually move the vehicle for loading or unloading during operation. When the weight of the vehicle is relatively heavy, part of the rack may be used in conjunction with a supporting board spanning between the ground and the rack, which allows the user to push the vehicle onto the rack. Thus, reducing labor.

However, the previous supporting board relies directly on the rack, resulting in poor assembly stability. Additionally, the supporting board is an external attachment that hinders convenient storage and negatively impacts usability.

Therefore, it is necessary to provide improvements addressing the shortcomings of well-known racks to resolve the aforementioned issues.

SUMMARY

In a first aspect of the present disclosure, a bike rack for connecting to a connecting device of a vehicle to provide transportation functionality is provided. The bike rack includes: a base; a carrying frame including at least one pair of carrying frame brackets that is configured to carry a front wheel and a rear wheel of a bike, each carrying frame bracket of the at least one pair of carrying frame brackets connected to the base, and a coupling portion arranged at one end of each carrying frame bracket distal to the base; a bearing mount located on one side of one of the at least one pair of carrying frame brackets; and a ramp board storable on the bearing mount. One end of the ramp board is formed with a corresponding coupling portion. The coupling portion of each carrying frame bracket is joinable with the corresponding coupling portion of the ramp board, such that the ramp board is inclined relative to a corresponding carrying frame bracket.

In another implementation of the first aspect, the bearing mount includes a first supporting frame and a second supporting frame. The first supporting frame and the second supporting frame are positioned on a same side of the one of the carrying frame brackets where the bearing mount is located, and each of the first supporting frame and the second supporting frame includes a U-shaped accommodating opening for placing the ramp board.

In another implementation of the first aspect, each of the first supporting frame and the second supporting frame is equipped with a fixing strap.

In another implementation of the first aspect, the ramp board includes a first plate body and a second plate body.

In another implementation of the first aspect, one end of each of the first plate body and the second plate body is formed with the corresponding coupling portion.

In another implementation of the first aspect, another end of the first plate body distal to the corresponding coupling portion has a connecting portion, and another end of the second plate body distal to the corresponding coupling portion has a corresponding connecting portion, and the first plate body is connectable to the corresponding connecting portion of the second plate body through the connecting portion, such that the first plate body and the second plate body are connected to form an integral structure.

In another implementation of the first aspect, each of the connecting portion and the corresponding connecting portion is equipped with a coupling shaft and a coupling groove. When the connecting portion is connected to the corresponding connecting portion, the coupling shaft of the connecting portion inserts into the coupling groove of the corresponding connecting portion, and the coupling shaft of the corresponding connecting portion inserts into the coupling groove of the connecting portion to form a stable connection between the first plate body and the second plate body.

In another implementation of the first aspect, the coupling portion comprises a protrusion. The corresponding coupling portion comprises a through-hole, and the ramp board couples the protrusion of the corresponding carrying frame bracket through the through-hole to secure the ramp board on one end of the corresponding carrying frame bracket.

In another implementation of the first aspect, the bearing mount is fixed, by a screw-locking mechanism, to the one side of the one of the carrying frame brackets where the bearing mount is located.

In another implementation of the first aspect, each carrying frame bracket is equipped with a fastening strap for securing the front wheel or the rear wheel of the bike.

BRIEF DESCRIPTION OF THE DRAWINGS

The present disclosure will be better understood from the following detailed description read in light of the accompanying drawings, where.

DETAILED DESCRIPTION

The following disclosure contains specific information pertaining to exemplary implementations in the present disclosure. The drawings in the present disclosure and their accompanying detailed disclosure are directed to merely exemplary implementations. However, the present disclosure is not limited to merely these exemplary implementations. Other variations and implementations of the present disclosure will occur to those skilled in the art. Unless noted otherwise, like or corresponding components among the figures may be indicated by like or corresponding reference numerals. Moreover, the drawings and illustrations in the present disclosure are generally not to scale and are not intended to correspond to actual relative dimensions.

For the purposes of consistency and ease of understanding, like features are identified (although, in some examples, not shown) by numerals in the exemplary figures. However, the features in different implementations may be different in other respects, and thus shall not be narrowly confined to what is shown in the figures.

The disclosure uses the phrases "in one implementation," "in some implementations," and so on, which may each refer to one or more of the same or different implementations. The term "coupled" is defined as connected, directly, or indirectly through intervening components, and is not necessarily limited to physical connections. The term "comprising" means "including, but not necessarily limited to;" it specifically indicates open-ended inclusion or membership in the so-described combination, group, series, and the equivalent.

Additionally, for the purposes of explanation and non-limitation, specific details, such as functional entities, techniques, protocols, standards, and the like, are set forth for providing an understanding of the described technology. In other examples, detailed disclosure of well-known methods, technologies, systems, architectures, and the like are omitted so as not to obscure the disclosure with unnecessary details.

Figure 1:
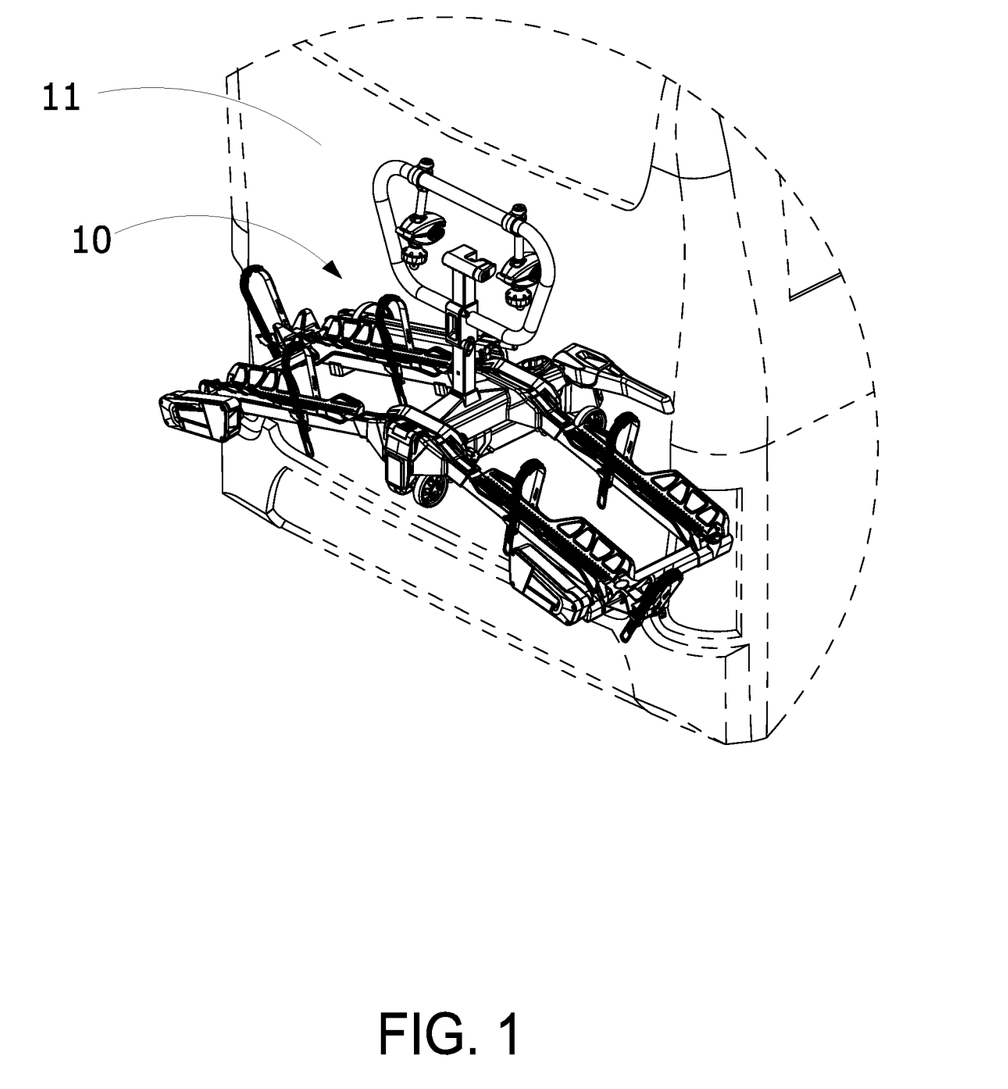
FIG. 1 illustrates a schematic diagram of a bike rack installed on a vehicle in accordance with an example implementation of the present disclosure.

FIG. 1 illustrates a schematic diagram of a bike rack installed on a vehicle in accordance with an example implementation of the present disclosure. A bike rack 10 may be connected to a connecting device of a vehicle 11. The bike rack 10 is typically suspended at the rear of the vehicle 11 for transporting bike(s).

Figure 2:
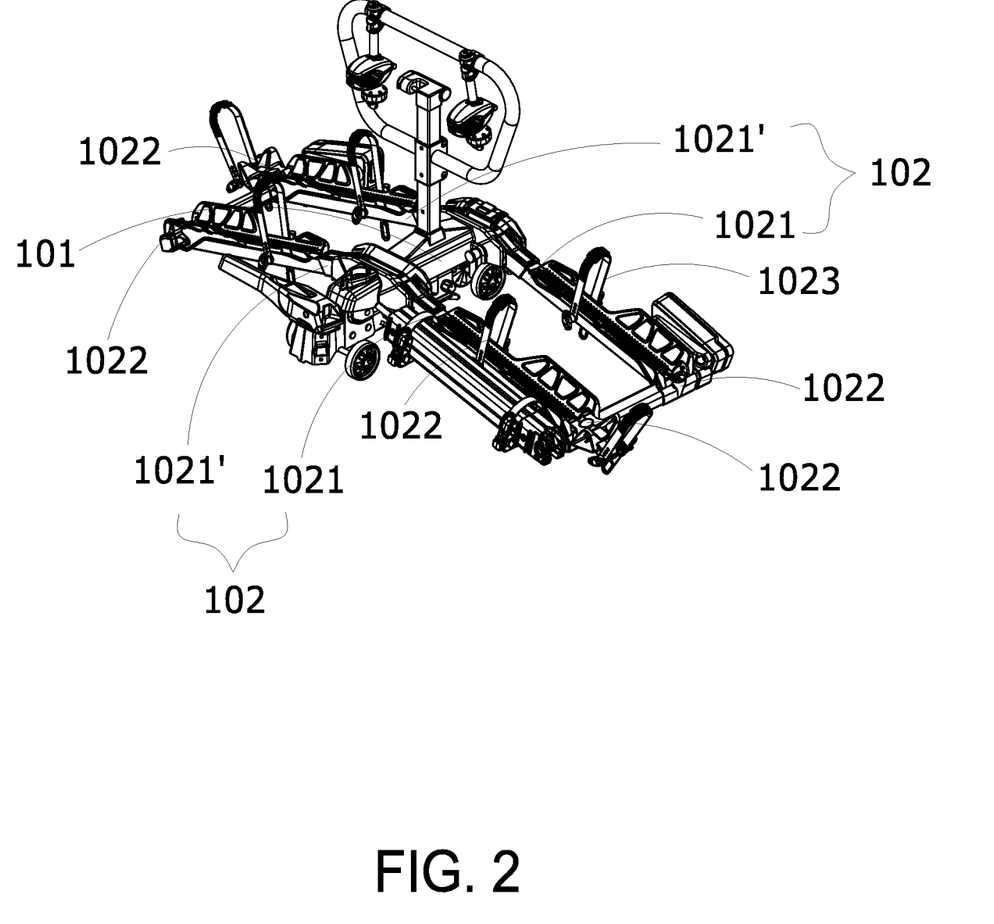
FIG. 2 illustrates an external schematic diagram of the bike rack in accordance with an example implementation of the present disclosure.

With reference to FIG. 2. FIG. 2 illustrates an external schematic diagram of the bike rack in accordance with an example implementation of the present disclosure. The bike rack 10 mainly includes a base 101, a carrying frame 102, a bearing mount 103, and a ramp board 104. The carrying frame 102 includes at least a pair of carrying frame brackets (1021, 1021') for carrying the front wheel and rear wheel of a bike. The carrying frame brackets (1021, 1021') are individually connected to the base 101. As shown in FIG. 2, the carrying frame brackets (1021, 1021') are positioned relative to the front and rear of the base 101, and a coupling portion 1022 is arranged at one end of each of the carrying frame brackets (1021, 1021') distal to the base 101. In some implementation, each of the carrying frame brackets (1021, 1021') is equipped with a fastening strap 1023 for securing the front wheel or the rear wheel of the bike. When the front wheel and rear wheel of the bike is respectively placed on the carrying frame brackets (1021, 1021'), the fastening strap 1023 may secure the bike's front wheel or the rear wheel to prevent the bike from detaching from the bike rack 10 during transportation.

Figure 3:
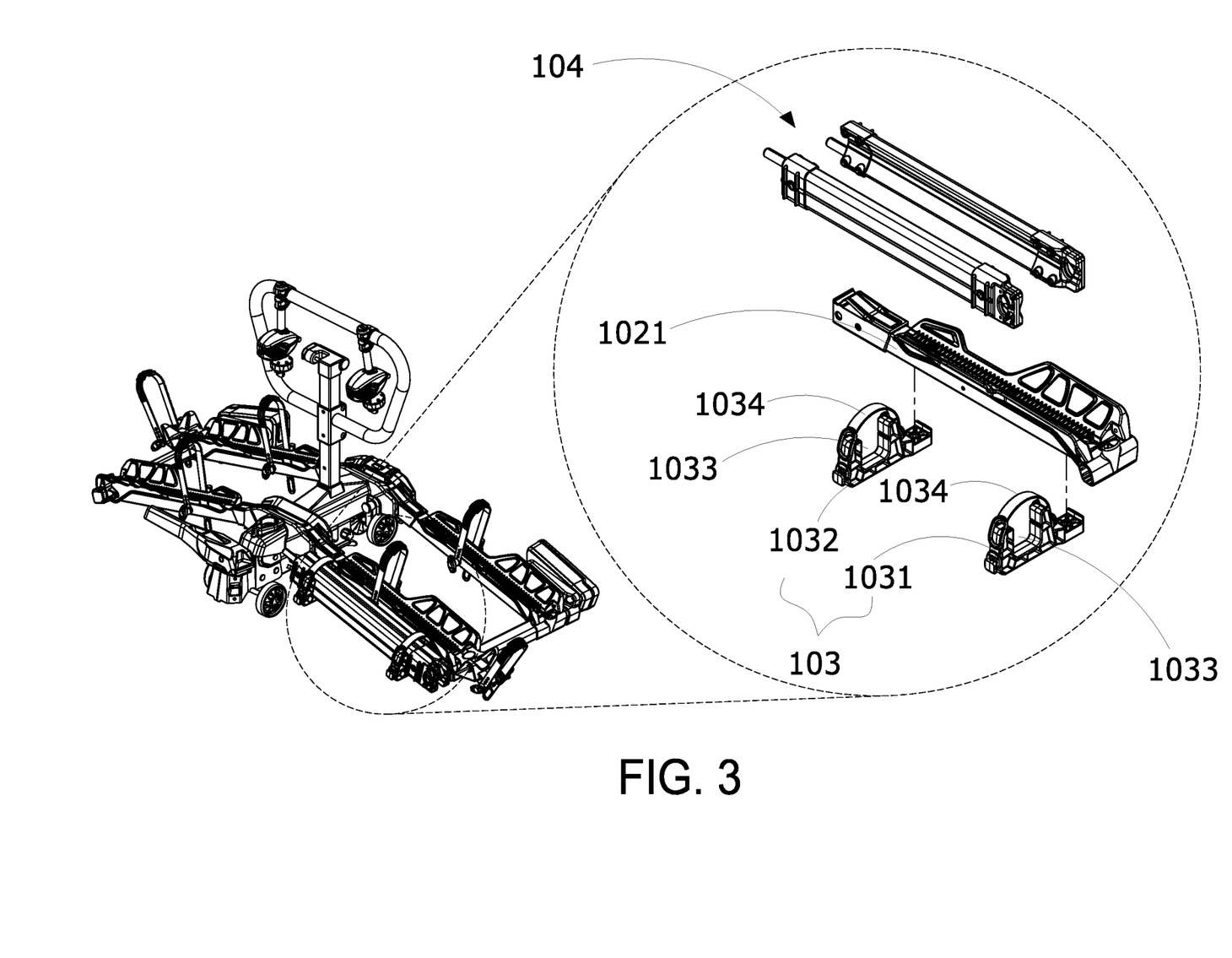
FIG. 3 illustrates a schematic diagram of a structure of a ramp board and a bearing mount in accordance with an example implementation of the present disclosure.

FIG. 3 illustrates a schematic diagram of a structure of the ramp board and a bearing mount in accordance with an example implementation of the present disclosure. The bearing mount 103 is positioned on one side of one of the carrying frame brackets 1021. The ramp board 104 is storable on the bearing mount 103. The bearing mount 103 is located on one side of one of the carrying frame brackets 1021 of the bike rack 10. The illustration in this figure is for explanatory purposes only, and it does not limit the placement position of the bearing mount 103, as explicitly stated. As shown in FIG. 3, in some implementation, the bearing mount 103 includes a first supporting frame 1031 and a second supporting frame 1032. The first supporting frame 1031 and the second supporting frame 1032 are spaced apart and arranged on the same side of the carrying frame bracket 1021. Each of the first supporting frame 1031 and the second supporting frame 1032 has a U-shaped accommodating opening 1033 which is suitable for placing the ramp board 104. In some implementation, each of the first supporting frame 1031 and the second supporting frame 1032 is equipped a fixing strap 1034. When the ramp board 104 is placed on the first supporting frame 1031 and the second supporting frame 1032, the fixing strap 1034 may secure the ramp board 104 to prevent the ramp board 104 from falling. Furthermore, the bearing mount 103 may be fixed, by various ways, such as screw-locking, structural snaps, and other fixing methods, to one side of the carrying frame bracket 1021 where the bearing mount 103 is located.

Figure 4:
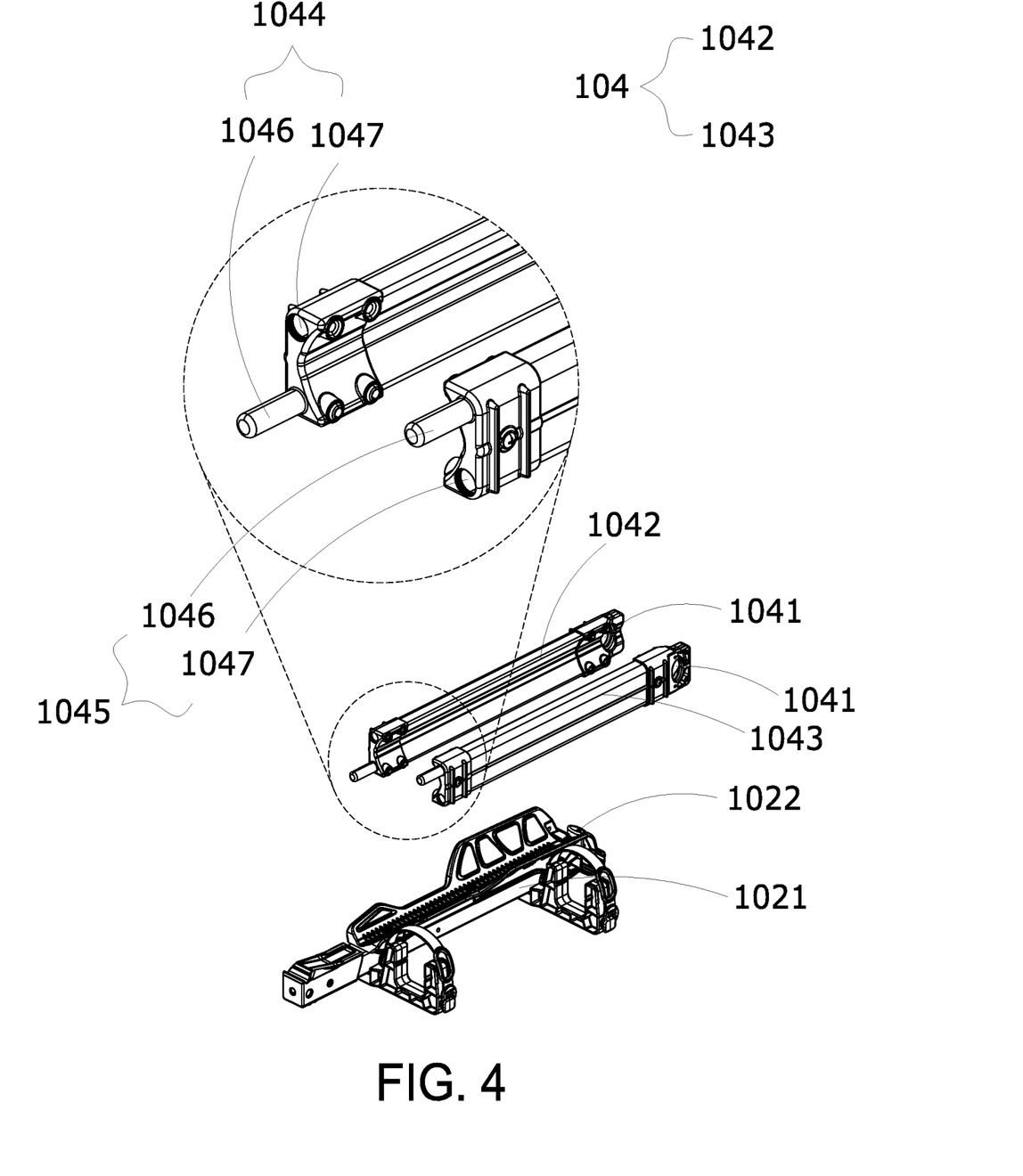
FIG. 4 illustrates a schematic diagram of an assembly of the ramp board in accordance with an example implementation of the present disclosure.

FIG. 4 illustrates a schematic diagram of an assembly of the ramp board in accordance with an example implementation of the present disclosure. One end of the ramp board 104 is formed with a corresponding coupling portion 1041. The coupling portion 1022 of the carrying frame bracket 1021 is coupled to the corresponding coupling portion 1041 of the ramp board 104. In some implementations, the ramp board 104 includes a first plate body 1042 and a second plate body 1043. The connection of the first plate body 1042 and the second plate body 1043 forms the body of the ramp board 104. Since the ramp board 104 includes the first plate body 1042 and the second plate body 1043, the first plate body 1042 and the second plate body 1043 can be disassembled and separated, thus allowing the first plate body 1042 and the second plate body 1043 to overlap for storage. Additionally, the ramp board 104 is designed as a foldable structure for compact storage. The structural form of the ramp board 104 is not limited to a specific configuration.

With reference to FIG. 4, in some implementations, one end of each of the first plate body 1042 and the second plate body 1043 is formed with a corresponding coupling portion 1041. When the first plate body 1042 and the second plate body 1043 are connected, both ends of the ramp board 104 have the corresponding coupling portion 1041, thus allowing the ramp board 104 to provide convenient and quick attachment to the coupling portion 1022 of the carrying frame bracket 1021. In some implementations, another end of the first plate body 1042 that is distal to the corresponding coupling portion 1041 has a connecting portion 1044, and another end of the second plate body 1043 that is distal to the corresponding coupling portion 1041 has a corresponding connecting portion 1045. The first plate body 1042 is connectable to the corresponding connecting portion 1045 of the second plate body 1043 through the connecting portion 1044, such that the first plate body 1042 and the second plate body 1043 are connected to form an integral structure. In some implementations, each of the connecting portion 1044 and the corresponding connecting portion 1045 is equipped with a coupling shaft 1046 and a coupling groove 1047. When the connecting portion 1044 is combined with the corresponding connecting portion 1045, the coupling shaft 1046 of the connecting portion 1044 inserts into the coupling groove 1047 of the corresponding connecting portion 1045, and the connecting shaft 1046 of the corresponding connecting portion 1045 inserts into the connecting groove 1047 of the connection portion 1044, thus ensuring a stable connection between the first plate body 1042 and the second plate body 1043. After the connection between the first plate body 1042 and the second plate body 1043 is established, the ramp board 104 is formed. When a bike positioned onto the ramp board 104, both the connection portion 1044 of the first plate body 1042 and the corresponding connecting portion 1045 of the second plate body 1043 provide excellent load-bearing capacity, thus preventing deformation of the ramp board 104.

Figure 5:
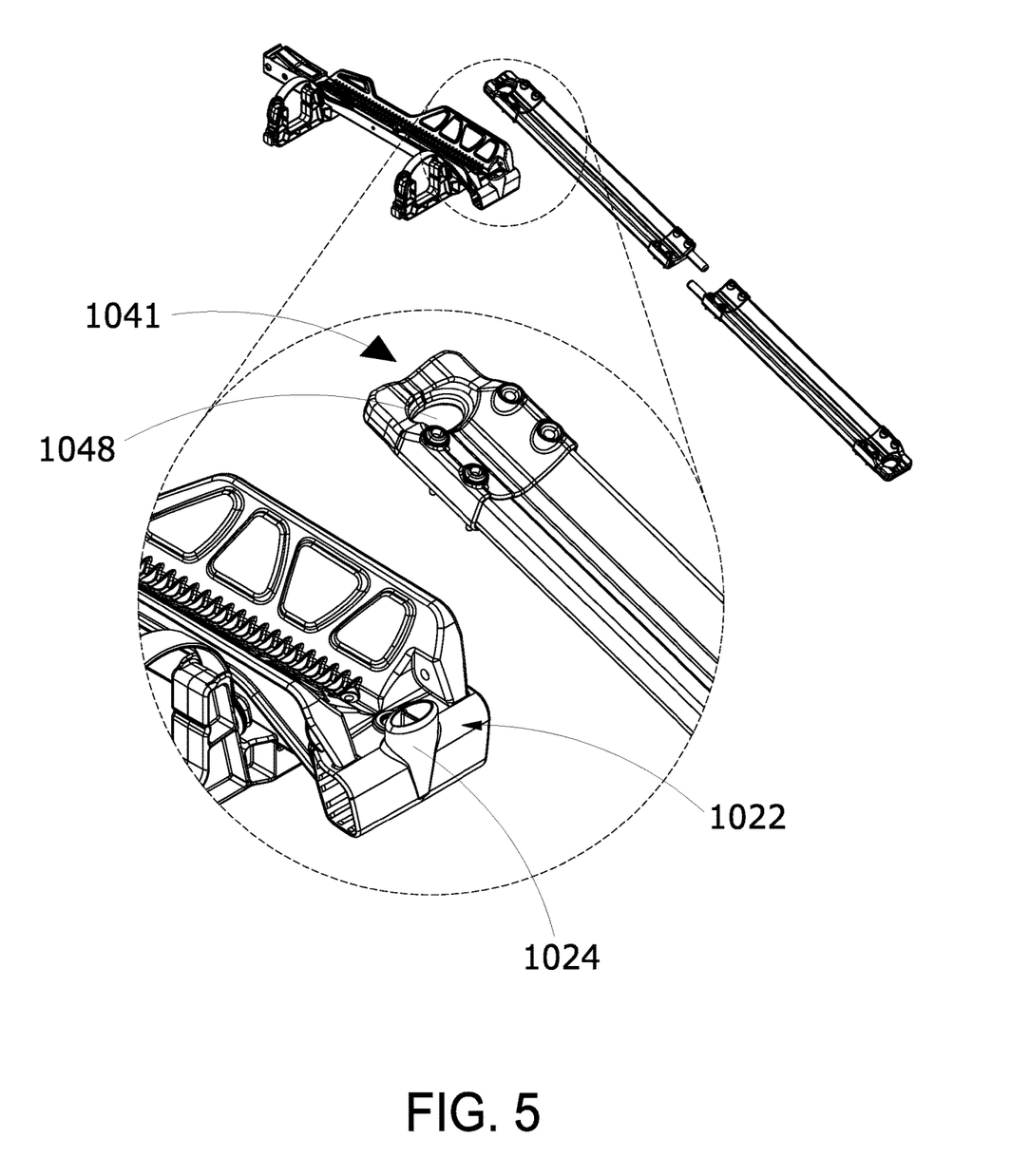
FIG. 5 illustrates a structural schematic diagram of a connecting portion and a corresponding connecting portion of the ramp board in accordance with an example implementation of the present disclosure.

FIG. 5 illustrates a structural schematic diagram of the connecting portion and corresponding connecting portion of the ramp board in accordance with an example implementation of the present disclosure. In some implementations, the coupling portion 1022 includes a protrusion 1024, and the corresponding coupling portion 1041 includes a through-hole 1048. The ramp board 104 couples the protrusion 1024 of the corresponding carrying frame bracket 1021 through the through-hole 1048, thereby securing the ramp board 104 on one end of the corresponding carrying frame bracket 1021.

Figure 6:
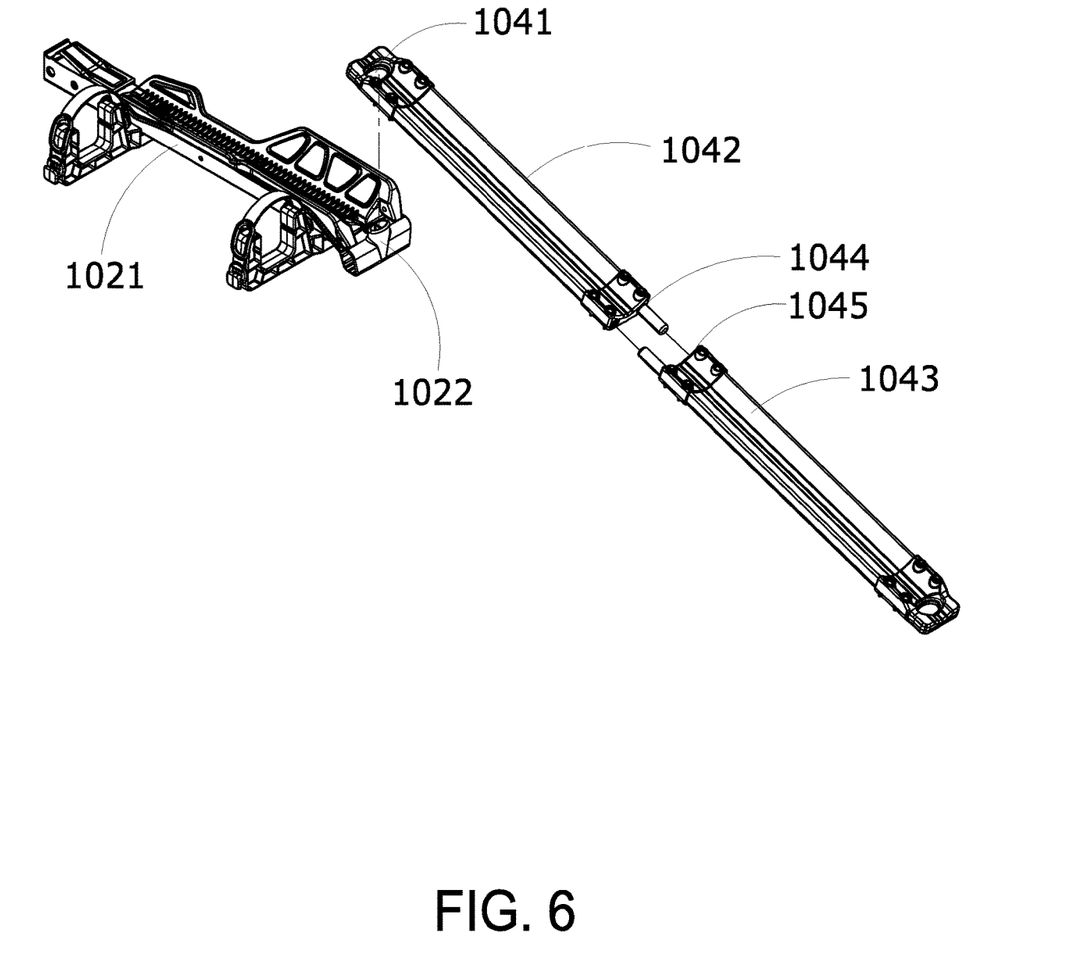
FIG. 6 illustrates a schematic diagram of a combination of the ramp board and a carrying frame bracket in accordance with an example implementation of the present disclosure.
Figure 7:
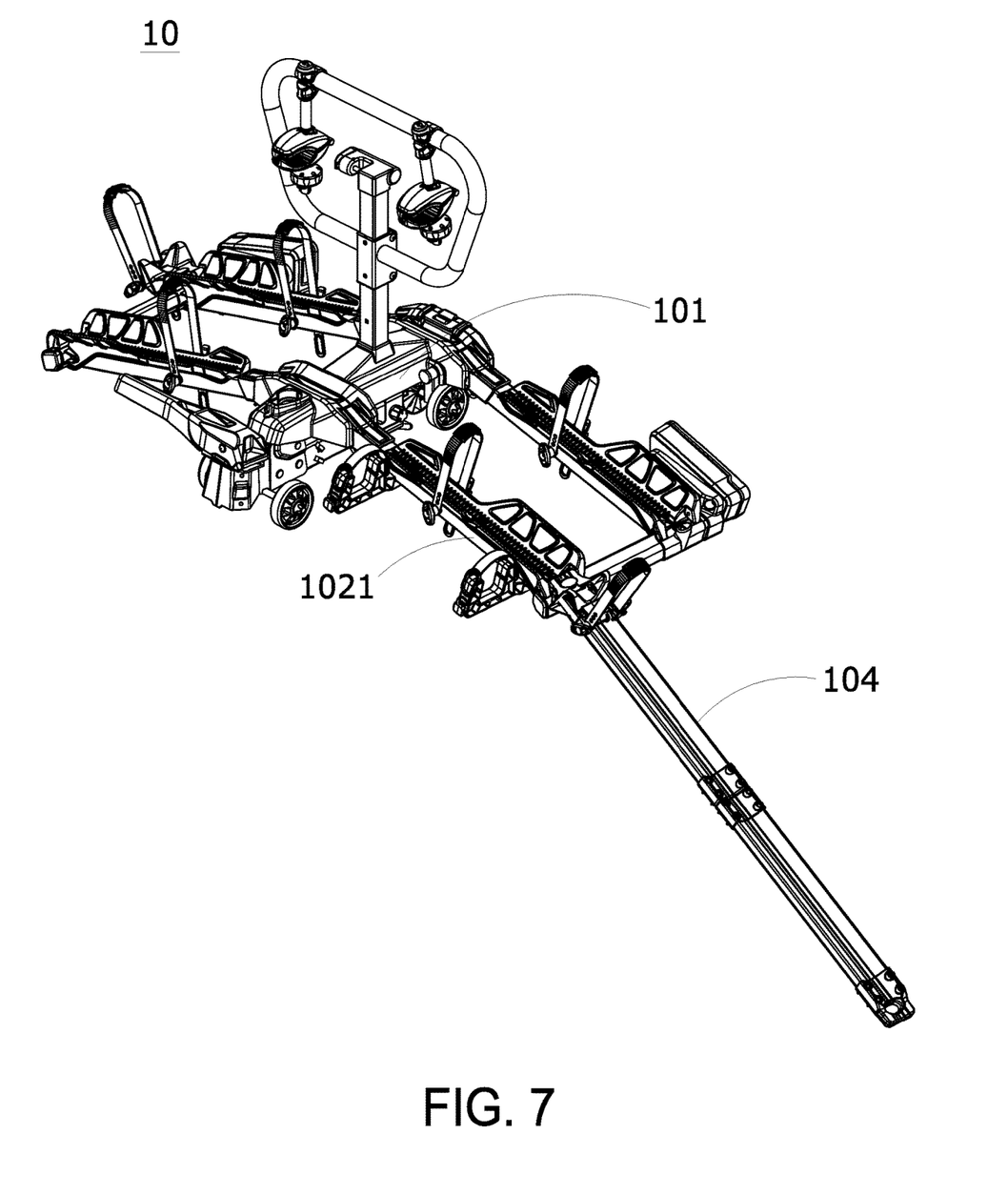
FIG. 7 illustrates a schematic diagram of an implementation of the bike rack in accordance with an example implementation of the present disclosure.

With reference to FIGS. 4 to 7, FIG. 6 illustrates a schematic diagram of the combination of the ramp board and the carrying frame bracket in accordance with an example implementation of the present disclosure. FIG. 7 illustrates a schematic diagram of an implementation of the bike rack in accordance with an example implementation of the present disclosure. The implementations of the present disclosure are as follows:

(1): Placing the bike on the bike rack. The ramp board 104 that is placed in the bearing mount 103 is taken out in advance. Further, the first plate body 1042 is connected to the corresponding connecting portion 1045 of the second plate body 1043 through the connecting portion 1044, thus forming the body of the ramp board 104. Then, the corresponding coupling portion 1041 of the ramp board 104 is combined and fixed with the coupling portion 1022 of the carrying frame 102, thus resulting in the ramp board 104 inclined relative to the carrying frame bracket 1021 and to facilitate the bike to be pushed onto the carrying frame bracket 1021 from the ground through the ramp board 104.

(2): Storage of ramp board. Once the bike is pushed onto the carrying frame 102 and fixed, the ramp board 104 is detached from the carrying frame 102 by separating the corresponding coupling portion 1041 from the coupling portion 1022 of the carrying frame 102. The first plate body 1042 and the second plate body 1043 of the ramp board 104 are then disassembled and separated. Then, the first plate body 1042 and the second plate body 1043 are arranged in an overlapped manner and are storable on the bearing mount 103. As such, the bike rack 10 provides convenience in both the use and storage of the ramp board 104, thus effectively addressing deficiencies in well-known portable racks.

The embodiments shown and described above are only examples. Many details are often found in the art. Therefore, many such details are neither shown nor described. Even though numerous characteristics and advantages of the present disclosure have been set forth in the foregoing description, together with details of the structure and function of the present disclosure, the present disclosure is illustrative only, and changes may be made in the details. It will therefore be appreciated that the embodiment described above may be modified within the scope of the claims.

What is claimed is:

1. A bike rack for connecting to a connecting device of a vehicle to provide transportation functionality, the bike rack comprising:
   a base;
   a carrying frame comprising: at least one pair of carrying frame brackets, the at least one pair of carrying frame brackets configured to carry a front wheel and a rear wheel of a bike, each carrying frame bracket of the at least one pair of carrying frame brackets connected to the base; and a coupling portion arranged at one end of each carrying frame bracket distal to the base;
   a bearing mount located on one side of one of the at least one pair of carrying frame brackets; and
   a ramp board storable on the bearing mount, one end of the ramp board formed with a corresponding coupling portion,
   wherein the coupling portion of each carrying frame bracket is joinable with the corresponding coupling portion of the ramp board, such that the ramp board is inclined relative to a corresponding carrying frame bracket.

2. The bike rack according to claim 1, wherein the bearing mount comprises a first supporting frame and a second supporting frame, the first supporting frame and the second supporting frame are positioned on a same side of the one of the carrying frame brackets where the bearing mount is located, and each of the first supporting frame and the second supporting frame includes a U-shaped accommodating opening for placing the ramp board.

3. The bike rack according to claim 2, wherein each of the first supporting frame and the second supporting frame is equipped with a fixing strap.

4. The bike rack according to claim 2, wherein the bearing mount is fixed, by a screw-locking mechanism, to the one side of the one of the carrying frame brackets where the bearing mount is located.

5. The bike rack according to claim 1, wherein the ramp board comprises a first plate body and a second plate body.

6. The bike rack according to claim 5, wherein one end of each of the first plate body and the second plate body is formed with the corresponding coupling portion.

7. The bike rack according to claim 6, wherein another end of the first plate body distal to the corresponding coupling portion has a connecting portion, and another end of the second plate body distal to the corresponding coupling portion has a corresponding connecting portion, and the first plate body is connectable to the corresponding connecting portion of the second plate body through the connecting portion, such that the first plate body and the second plate body are connected to form an integral structure.

8. The bike rack according to claim 7, wherein each of the connecting portion and the corresponding connecting portion is equipped with a coupling shaft and a coupling groove, when the connecting portion is connected to the corresponding connecting portion, the coupling shaft of the connecting portion inserts into the coupling groove of the corresponding connecting portion, and the coupling shaft of the corresponding connecting portion inserts into the coupling groove of the connecting portion to form a stable connection between the first plate body and the second plate body.

9. The bike rack according to claim 1, wherein the coupling portion comprises a protrusion, the corresponding coupling portion comprises a through-hole, and the ramp board couples the protrusion of the corresponding carrying frame bracket through the through-hole to secure the ramp board on one end of the corresponding carrying frame bracket.

10. The bike rack according to claim 1, wherein the bearing mount is fixed, by a screw-locking mechanism, to the one side of the one of the carrying frame brackets where the bearing mount is located.

11. The bike rack according to claim 1, wherein each carrying frame bracket is equipped with a fastening strap for securing the front wheel or the rear wheel of the bike.

* * * * *